United States Patent
Rabinovich et al.

[11] Patent Number: 6,167,427
[45] Date of Patent: Dec. 26, 2000

[54] REPLICATION SERVICE SYSTEM AND METHOD FOR DIRECTING THE REPLICATION OF INFORMATION SERVERS BASED ON SELECTED PLURALITY OF SERVERS LOAD

[75] Inventors: Irina Rabinovich; Michael Rabinovich, both of Gillette, N.J.

[73] Assignee: Lucent Technologies Inc., Murray Hill, N.J.

[21] Appl. No.: 08/979,611

[22] Filed: Nov. 28, 1997

[51] Int. Cl.[7] .......................... G06F 15/16; G06F 15/167
[52] U.S. Cl. .......................... 709/201; 709/203; 709/217; 709/218; 709/219; 707/204; 707/205
[58] Field of Search .................................. 709/203, 201, 709/202, 316, 217, 218, 219, 221, 223, 226, 229, 235, 238, 249; 707/204, 205, 200

[56] References Cited

U.S. PATENT DOCUMENTS

| | | | |
|---|---|---|---|
| 4,974,256 | 11/1990 | Cyr et al. ................................. | 379/113 |
| 5,539,883 | 7/1996 | Allon et al. ............................. | 395/675 |
| 5,588,147 | 12/1996 | Neeman et al. ............................ | 707/1 |
| 5,708,812 | 1/1998 | Van Dyke et al. ...................... | 395/712 |
| 5,745,683 | 4/1998 | Lee et al. ................................ | 709/250 |
| 5,774,668 | 6/1998 | Choquier ............................. | 395/200.53 |
| 5,787,442 | 7/1998 | Hacheri et al. .......................... | 707/201 |
| 5,832,219 | 11/1998 | Pettus et al. ........................ | 395/200.33 |
| 5,923,837 | 7/1999 | Matias ...................................... | 714/28 |

OTHER PUBLICATIONS

Microsoft Press Computer Dictionary, 3rd. Ed., Microsoft Press, Sep. 1997.
Baumgariner et al., Global load balancing strategy for distributed computer system, IEEE, Jul. 1988.
Dandamudi et. al., A hierarchical load sharing policy for distributed systems, IEEE, Sep. 1997.

*Primary Examiner*—Le Hien Luu
*Assistant Examiner*—Beatriz Prieto
*Attorney, Agent, or Firm*—William Ryan

[57] ABSTRACT

A system an method for efficiently providing access by a large number of clients to objects located at a large number of information servers. A non-bottleneck solution is provided to sharing load among servers by migrating or replicating objects over from highly loaded servers to less highly loaded servers. Objects that experience low loading are deleted to make room for more highly used objects and to permit make space for new objects. A naming service is provided to provide rapid access to a replica of a requested objects, while avoiding directing access requests to servers from which replicas of requested objects have been deleted. Hierarchical ordering of replication and naming functions permits a variety of particular access methods to be realized.

13 Claims, 5 Drawing Sheets

REPLICATION SERVICE SYSTEM AND METHOD FOR DIRECTING THE REPLICATION OF INFORMATION SERVERS BASED ON SELECTED PLURALITY OF SERVERS LOAD

FIELD OF THE INVENTION

The present invention relates generally to the field of distributed information systems. More particularly, the present invention relates, in one aspect, to selective replication and distribution of data objects and services between and among a plurality of information systems. Still more particularly, aspects of the present invention relate to distributed systems and methods for efficient provisioning of objects and services to clients in large (including global) networks.

BACKGROUND OF THE INVENTION

As networked computers and databases, and users of these systems, have proliferated in numbers and geographic spread, interest has grown in efficiently providing access to information objects and services (hereinafter "objects") at host computers or information servers. Presently, for example, thousands of Internet servers provide a very large number of objects to millions of user clients worldwide. These servers are located in many countries around the world and typically at many locations in each country. In other particular cases, network service providers and private corporations locate server nodes at widely separated points in their networks.

A particular challenge faced by developers of these networks of servers is that of providing access to a widely distributed set of clients without overloading particular hosts. The overload may occur, e.g., because a server stores objects that are in high demand and/or the server is a repository for large numbers of objects. Meeting this challenge proves especially difficult when the demand for particular objects varies considerably with time. Thus, while a straightforward replication of all objects at all servers would generally improve availability of a particular object to a range of clients, the cost of such replication is prohibitive. In fact, the economics of replication, distribution and storage do not usually permit design for a worst-case predicted demand condition in such large networks.

The load on each server is an important consideration in adequately meeting demand from clients for objects; in general, it is desirable to balance the load among servers. In many existing replicated object systems, with relatively few servers, this question is quite tractable: system administrators or a dedicated computer system process can monitor the load of servers and decide on selective replica placement. When the number of servers increases, however, such human or dedicated process cannot be expected to efficiently direct the creation and deletion of replicas.

Current object-location techniques used in distributed server networks assume that sets of object replicas are well known to clients. However, when the number and geographic distribution of servers increases to dense national and international proportions this assumption proves unrealistic; the ability of clients to efficiently locate desired objects at servers increases markedly.

One possible solution to the scalability problem of the replication service would be to use a localized "greedy" approach. For example, each hosting server might choose another hosting server at random, and perform load comparisons with this other server. If the load difference exceeds a certain distribution threshold d, the less-loaded server would obtain some replicas of objects kept on the higher-loaded server, thus taking up a portion of its load. Due to the randomness of choice, all pairs of servers would be involved. An approach similar to this is presented in "Adaptive load sharing in homogeneous distributed systems," by T. L. Casavant and J. G. Kuhl, *IEEE Trans. on Software Eng.*, vol. 2(14), pp. 141–154, Feb. 1988. The Casavant, et al paper also defines a threshold for which nodes with a load below the threshold are constrained to not initiate load comparison.

However, as the number of servers grows, each server must initiate load comparison more frequently. Otherwise, the average time between load distribution events for any given pair of nodes will grow linearly with the number of nodes, as will the lag between load changes and detection of these changes. Since a server has a limit on how frequently it can perform load distribution, this solution is not scalable to large systems.

Another approach is to organize hosting servers in a connected graph structure, with neighboring nodes performing pair-wise load distribution. Since the graph is connected the load distribution involves all servers. This technique is similar to an algorithm described in "Simulations of three adaptive, decentralized controlled, job scheduling algorithms," by J. A. Stankovic, *Computer Networks*, 8, pp. 199–217, August 1984. One difference is that in the Stankovic paper, when a node sends its load data to a neighbor, it includes its information about all other nodes. These techniques also prove to not be scalable as required for large networks.

Another important consideration in establishing a global or other large information system is that of a naming service for objects and servers. In general, naming services are used to map a logical name of an object into the physical name of a replica. The main limiting factors for the name service are the number of clients (which determines the number of requests for name resolution), and the number of objects (which determines the size of the name-mapping database). Another factor is the number of requests from hosting servers for updates of name mappings.

Name services are well known in the art, including the Domain Name Service (DNS) used in today's Internet and described, e.g., in P. V. Mockapetris, "Domain Names—Concepts and Facilities," Request for Comments 1034, DDN Network Infromation Center, SRI International, November, 1987. Also used in Internet naming is CCITT (now ITU) Recommendation X.500.

However, mappings between host name and IP address seldom change in the DNS scheme. Rather, DNS is primarily an append-only database that permits the addition of new host name/IP address mappings; current DNS implementations support little or no dynamic mapping of host name to IP address.

Using current DNS naming service techniques to map logical object names to physical replicas, name server responses cached by clients become incorrect much more quickly. Thus, clients must query the name service much more often, greatly increasing the burden on the name service. Weak-consistency schemes for replicating the mapping database such as that described in B. W. Lampson, "Designing a global name service," *Proc. of ACM Conf. on Principles of Distributed Systems*, pp1–10, 1986 result in many incorrect responses to clients. These incorrect responses result in the use of an incorrect physical name to access an object—with resulting failure and request renewal.

World-Wide-Web (Web) syntax and semantics for object names (URLs) are quite different from those in DNS or X.500. Use of DNS or X.500-compliant symbolic names in networks like the Web would require extensive changes in Web browsers.

SUMMARY OF THE INVENTION

Limitations of the prior art are overcome and a technical advance is made in accordance with the present invention described in illustrative embodiments herein.

In one illustrative embodiment, a method is described for achieving the number and placement of object replicas in a network of servers. This result is achieved without the need for bottleneck-causing global decisions. Using the present inventive methods and resulting network, a server network is realized in which creation and deletion of replicas is minimized when a steady demand for all objects persists for an appropriate period of time. Moreover, when such steady demand exists the load can be distributed among servers in a substantially equal manner.

In accordance with an illustrative embodiment, the decision on the number and placement of replicas is made within the network. Moreover, the process is dynamic, with replicas being created and deleted as demand and geographic origins of requests change. The illustrative replication is advantageously transparent to end-user clients, except in improved network response.

In accordance with an aspect of the illustrative embodiment, no high demand bottlenecks arise which might require an increase of processing power at any node. Rather, as load increases, the number of nodes can be increased to handle the increased demand. This result obtains whether the high demand is based on the number of clients requesting objects increases, or whether the demand arises from an increase in the number of objects.

In accordance with one aspect of the present invention, a new naming service is introduced for finding object replicas. Advantageously, the existing DNS name services can be used as a first level of indirection in the new naming service.

In other particular contexts, such as when the characteristics of languages for specifying object content or when certain network protocols are used, the illustrative inventive techniques, or their application, may be modified as required to achieve desired results.

BRIEF DESCRIPTION OF THE DRAWING

The above-summarized description of illustrative embodiments of the present invention will be more fully understood upon a consideration of the following detailed description and the attached drawing, wherein.

DETAILED DESCRIPTION

Illustrative System Overview

Figure 1:
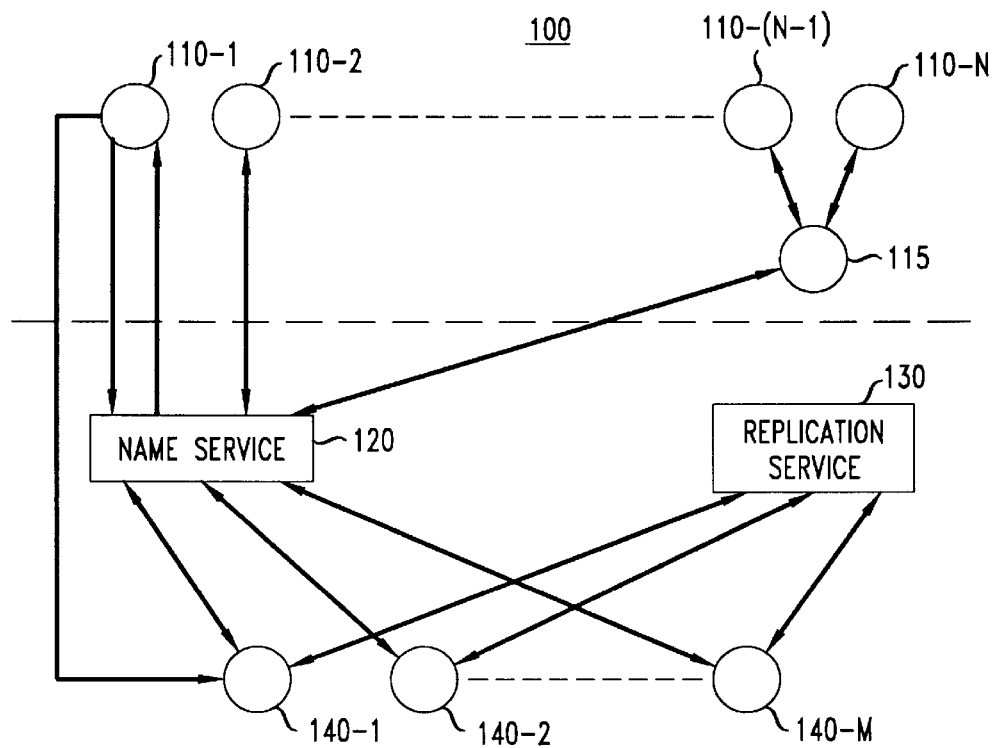
FIG. 1 is an overall view of an illustrative network system embodiment of the present invention.

FIG. 1 shows an illustrative application of the present invention. There, a wide area network 100 comprises a large number of servers 140-$i$, i-1, 2, ... M and clients 110-$j$, j=1,2, ... N. Servers 140-$i$ host objects publicly accessible to clients 110-$j$. A node may play a dual role as a server for some objects and a client for other objects.

Clients access objects by their names. The name of an object allows a client to infer the identity of hosting server (e.g., its domain name or IP address) and access method (i.e., the protocol to be used to access the server). For illustrative purposes, it will be assumed that object names embed a domain name of the server that hosts the object. One instance of this environment is the Internet, which comprises, inter alia, Web servers and Web browsers. Such servers typically include computers and related equipment for controlling (often very large) databases, while browsers are typically associated with client terminals or (usually smaller) computers, all as is well known in the art.

The network of FIG. 1 is a network of information systems, where objects provide access to information, and thus do not change as a result of an access by a client. However, an access may result in extensive processing by the server to compute the result of the client's query. For example, in a geographical database, a request for the map of a specified area in a specified scale may require generation of the map, which typically is an expensive operation in terms of server resources.

A load measure exists for each server 140-$i$ in FIG. 1 to allow comparison of load on each server. For example, when the servers operate using the UNIX operating system, the length of the input queue (as measured, e.g., by the output of the uptime command) proves to be convenient for this purpose. In other particular environments, other measures of load may be preferable.

In addition, each individual server can estimate the fraction of its total load due to a given object on the server. In typical operation this is accomplished by monitoring resource consumption (e.g., CPU time, 10 operations, etc.) due to requests for individual objects and dividing up the total load between objects in proportion to their consumption. While the illustrative servers 140 in FIG. 1 may be quite different in total system resources, a server with an average queue length of 1.5 is more heavily loaded than a server with an average queue length of 0.8, regardless of the quantity of processing needed at each server to achieve these queue lengths.

In achieving purposes of the present invention, the illustrative embodiment of FIG. 1 provides for replicating an object located on a particular server, say server p, on another server, server q. Alternatively an object may be migrated from server p to server q. $x_p$ will denote a replication of object x on server p. load(p) denotes the load of node p, and load($p_x$) denotes the load on node p due to object x. In general, if x is migrated from node p to node q, the reduction of load on p may not be equal to the increase of load on q, due to difference in processing power of p and q.

Typically, there are two ways by which a system can balance the load: directing client requests to less loaded servers (among those with replicas of the requested object), and migrating or replicating objects between servers. Server selection for a particular client request is typically based on the geographic origin of the request (i.e., the closest replica is chosen), but the selection may be based on another criterion, or at random. Thus, the load, is illustratively balanced by replication or migration of objects. The event of migrating an object from server p to server q, or creating a new replica of an object on q by copying it from p, is called a distribution event. Servers p and q are, respectively, the source and the recipient in the distribution event.

It is typically desired that when in a network system like that of FIG. 1 the demand for all objects does not change, the system stabilizes into a state in which the loads are distributed equally among all hosting servers. Thus, when the demand for different objects changes and stabilizes at different levels, the system will eventually re-distribute the load so that it is again distributed equally among hosts. However, small changes in the demand for objects should not trigger load re-distribution; otherwise, the system will hardly ever be stable.

It proves convenient to consider a mechanism for load balancing to be stabilizing if there exist two constants, demandDiff and loadDiff such that if the variation in time of the request rate for every object x stays within demandDiff, the system eventually reaches a state where no replicas are created or dropped, and the difference between the load of any two hosting servers does not exceed loadDiff.

Likewise, it proves advantageous to avoid load balancing of a type in which isolated regions are created with autonomous load distribution in each region. Thus, a load balancing mechanism desirably avoids a condition in which nodes from different regions have significantly different load, even if individual regions are not in the stable state. More formally, for some L and l<L, and with all nodes partitioned into three sets, $A(L,l)=\{p|load(p) \leq L\}$, $B(L,l)=\{p|l \leq load(p) <L\}$, and $C(L,l)=\{p|load(p)<l\}$. A mechanism for load balancing is called contiguous if there exist some constants d and t such that for any L and l<L−d, if no node moves between sets A(L,l), B(L,l) and C(L,l) for time t, then there will be a distribution event either with a source in A and recipient outside A, or with a source outside C and recipient inside C.

The contiguity criterion may be illustrated by a system with four servers i, j, k, and l. A load balancing mechanism can be derived that balances the load between nodes in node pair i and j, and separately between nodes in node pair k and l, with no balancing performed between the node pairs. The demand for objects hosted by the first pair (i, j) will be assumed to be very high, but unstable (so that there are continuous distribution events occurring between i and j). Also, it will be assumed that there is unstable but overall low demand for objects on k and l. Thus the load on i and j greatly exceeds the load on k and l, while fluctuating within each pair. This example shows the importance of both the contiguity criterion as well as the stabilization criterion.

Returning to the system of FIG. 1, when an object is created, it is placed on one of the hosting servers and is registered with a name service 120. Registering of a related type is known in a so-called "persistent URL" proposal for use in the World Wide Web (hereinafter "Web") operation in the Internet, but such registering of persistent URLs is not part of the present invention. This registration in accordance with the illustrative embodiment involves sending a message to name service 120 informing that service of the physical name of the object and assigning it a symbolic name. The physical name of an object is the name by which the object can be accessed by the clients (in the Web context, this would be the object's URL). The symbolic name uniquely identifies the object. However, it resolves into the name service identity rather than the identity of the server hosting the object.

The symbolic name is advertised to the users; it is the name known to the clients. When a client wants to access the object, it uses its symbolic name. Since this name resolves into the name service identity, the request for the object actually arrives at the name service 120 as shown by the link between typical client 110-1 and name service 120. Name server 120 finds a corresponding physical name (due to replication, a symbolic name can map into multiple physical names) and sends it as a special "re-direct" response to the client. The client, such as 110-1 in FIG. 1 then uses the physical name received to access the object at the identified server, such as 140-1 in FIG. 1.

Asynchronously, hosting servers periodically report their load to the replication service unit 130. The replication service 130 uses these reports to migrate or replicate objects so that the load is shared among all hosting servers, and replicas are placed close to a majority of requests for the corresponding objects.

When a hosting server 140-j creates or drops a replica of an object, it records this fact at the name service 120. Thus, the name service keeps a mapping of the symbolic name of an object to a set of physical names of currently available replicas. When resolving a symbolic name, the name service chooses one of the current set of physical names, applying a fair procedure and taking into account the geographical location of the requesting client.

The Replication Service

One potential bottleneck in the system of FIG. 1 is the replication service. Indeed, as the number of hosting servers and hosted objects increases, the number of load reports the replication service must process grows, and so does the search space for deciding on replica placement. This section describes a scalable distributed architecture for the replication service 130. Scalability is of interest to the present discussion because important target networks are assumed to be large.

The following description of a policy for replica placement is based on the objective of load distribution. A challenge in designing such a policy is that the policy must ensure globally desirable system behavior (according to criteria such as the stabilizing and contiguity criteria discussed above) without creating any bottleneck-producing global decision points. Those skilled in the art will develop other detailed policies and heuristics within the scope of the presently described architecture and infrastructure.

Figure 2:
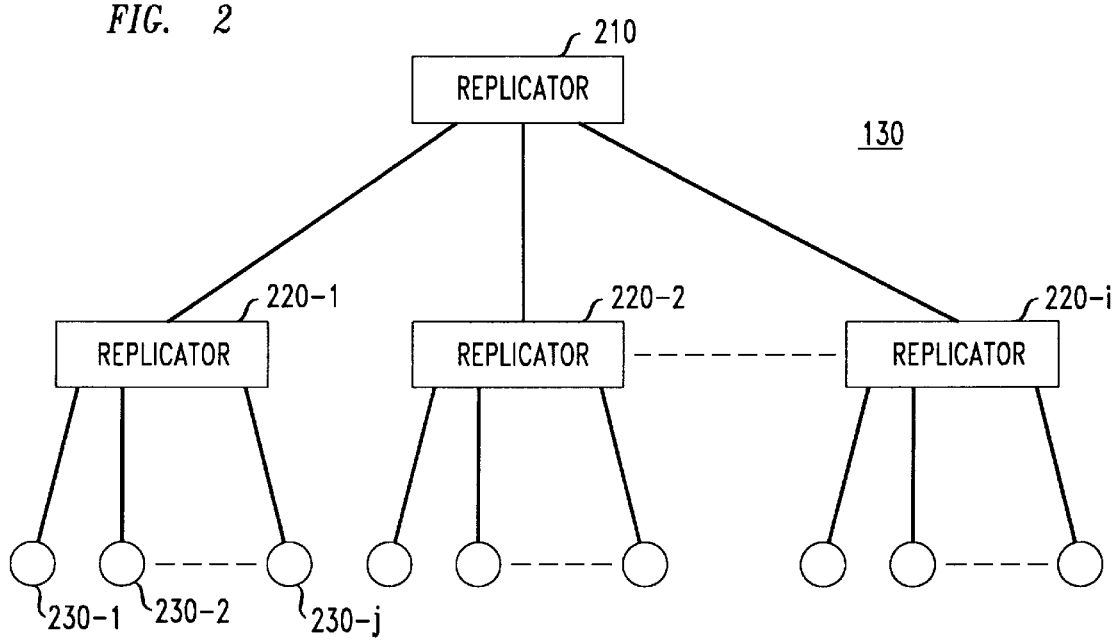
FIG. 2 shows a replication service arrangement comprising a hierarchy of replicators for use in the network of FIG. 1.

An illustrative structure for the replication service 130 of FIG. 1 is shown in FIG. 2. There, it will be seen that replication service 130 comprises a hierarchy of replicator servers. Each replicator server in FIG. 2 comprises standard network computer functionality, including a central processing unit, main and auxiliary memory and input/output facilities, all arranged to receive information from information servers and other replicators to perform, inter alia, analyses of load information, and to generate control messages relating to these analyses and to creation and deletion of object replicas. The highest level replicator is at node 210 and replicators 220-j appear at nodes directly below node 210. Only two levels are shown explicitly in the hierarchy of FIG. 2, but other levels of replicators will appear as required for particular networks at respective nodes at other levels in the hierarchy. For very large networks, the level of such nodes may extend over many such levels in a hierarchy. Direct descendants of a node in the hierarchy of replicators in FIG. 2 are referred to as subordinates. For a server S, let the hosting set H(S) be a set of hosting servers in the subtree rooted at S. In particular, for a hosting server p, H(p)={p}. The hierarchical structure of FIG. 2, can be used to implement a variety of load re-distribution methods, as will now be described in more detail.

A first solution based on the structure of FIG. 2 is to use the replicator hierarchy only to find the hosting servers with the highest and lowest load. In this solution, hosting servers report their load to the lowest level replicators. These lowest level replicators then choose the servers with the highest and lowest load and pass this information up to their parents. The parents then choose hosting servers with the highest and lowest load, among those reported by their subordinate replicators. Thus, each replicator reports up the information about the hosting servers with highest and lowest load in its hosting set. This process continues until it reaches the root, which will identify the hosting servers with the highest and lowest load in the system and re-distribute the load between them. Since non-root replicators work in parallel, the whole process takes place in logarithmic time.

Figure 5:
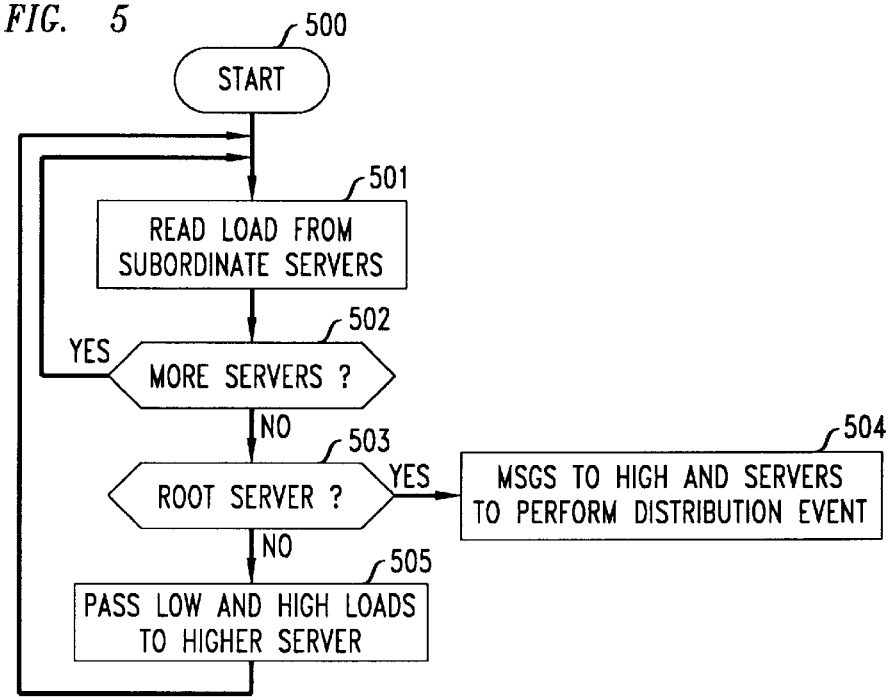
FIG. 5 is a flowchart illustrating a load balancing system and method in accordance with one embodiment of the present invention.

The flowchart of FIG. 5 illustrates this process. Starting at block 500 in the flowchart, high and low load information is read from subordinate nodes as indicated by process block 501. This is continued at block 501 until the decision at block 502 indicates that all immediately subordinate nodes have input their information. A further test is made at decision block 503 to determine if the information has been input to the root node from its subordinate nodes. If the node processing inputs is not the root node, the high and low load information is passed to the next higher node at block 505. This process continues until the root server node is the node receiving the inputs. Then, messages are sent to the high and low load nodes as described above and indicated by process block 504 in FIG. 5 to cause a distribution event to occur. This solution can be shown to satisfy the stability and contiguity criteria described above.

Figure 6:
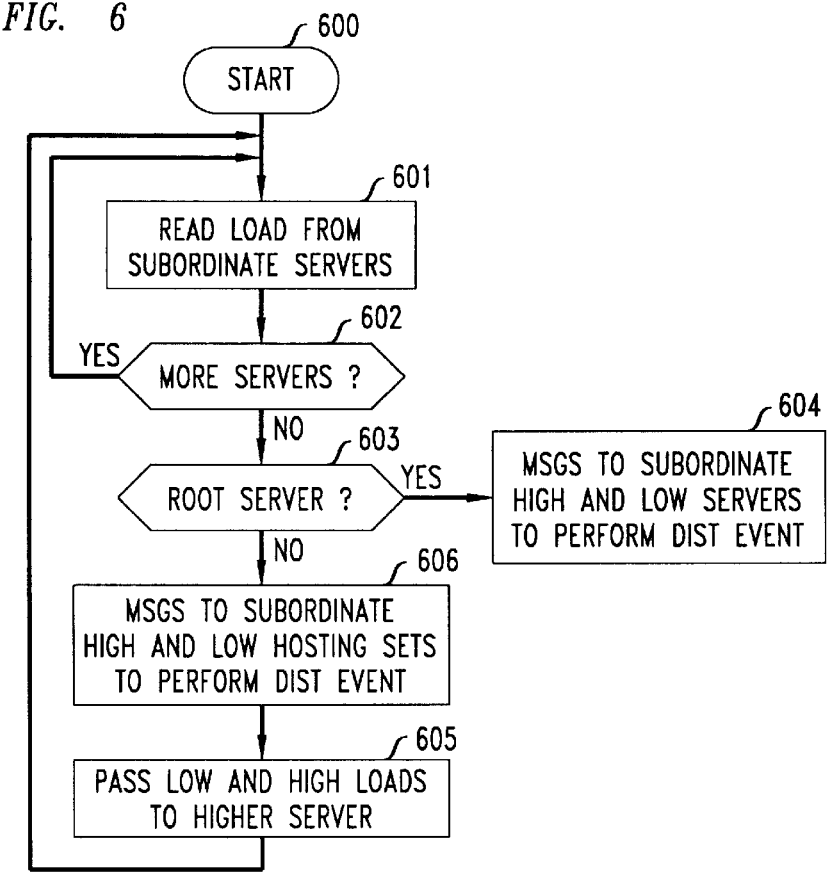
FIG. 6 is a flowchart for a modified version of the system and method of FIG. 5.

Certain inefficiencies can be identified in the process shown in FIG. 5 and described above that may be important in some network applications. First, the work of lower level replicators whose hosting sets do not contain nodes with the globally highest and lowest load is wasted, even if nodes with the load difference over the threshold were found. Second, the load between only two (or, more generally, a constant number of) hosting servers is re-distributed as the result of an entire sweep of load-reporting messages through the whole hierarchy. Thus, many sweeps may be required before the load is balanced. A more efficient variant of the solution shown in FIG. 5 and described above employs a replicator at each level to distribute load between hosting sets of its subordinates, as illustrated in the flowchart of FIG. 6. Sending of such offload messages at each, or selected ones of, replicators at different level of the hierarchy of replicator provides important advantages in some implementations of the present invention. It will be noted below in connection with the process summarized in the flowchart of FIG. 7 that offload messages can be sent at various replicator levels to subordinates when predetermined load imbalances are recognized.

A Preferred Load Balancing Protocol

Figure 3:
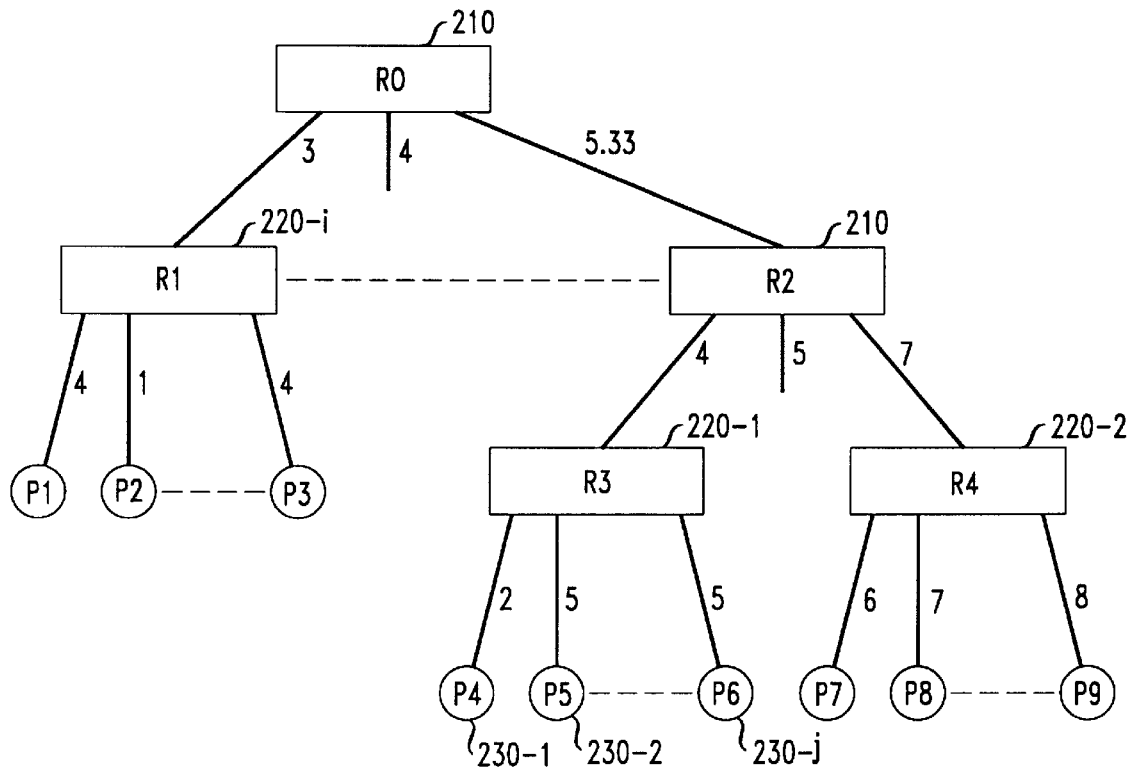
FIG. 3 shows an application of the replication service arrangement of FIG. 2.

Another system and method solution related to the above-described load balancing solutions that has been found to be particularly advantageous in a variety of network contexts is illustrated in FIG. 3. In this alternative and preferred embodiment, each replicator distributes load among subtrees rooted at its subordinates, and each subordinate accomplishes load distribution within its subtree. This solution will now be described in greater detail, initially with reference to FIG. 3.

In accordance with this illustrative preferred embodiment, a protocol is employed which uses three parameters. One of these parameters is a system-wide parameter, the distribution threshold, d, which reflects the load difference between servers required to trigger distribution events. Another parameter, the deletion threshold, u, is host-specific. A hosting server p deletes replicas (except for the last replica) of an object such that load($x_p$)<$u_p$. As discussed above, the same rate of requests for the same object may result in different values of the object load at different servers. However, $u_p$ is adjusted for every server such that if object x qualifies for deletion on one server under certain request rate, it would qualify for deletion on all servers under about the same rate. The third parameter employed by this illustrative protocol is a system-wide stability factor s that reflects the level of variation in server load that should not cause distribution events. The three parameters are constrained by a condition $2*u_{max}+s<d$, where $u_{max}$ is the maximum deletion threshold across all hosting servers. Each replicator is advantageously arrranged to have at least three subordinates.

In accordance with the illustrative protocol, a hosting server p periodically examines all of its objects, attempting to delete object replicas whose load is below $u_p$. It does not, however, delete the sole replica of an object in the system. It then sends a load report to its parent replicator. Every replicator collects load reports from its subordinates and sends the load report to the higher-level replicator.

The load report from node S (either a hosting server or a replicator) has a form (avLoad$_S$, H(S), $p_{max,S}$, $p_{min,S}$, load$_{max,S}$, load$_{min,S}$), where avLoad$_S$ is the average load of hosting servers from H(S). Thus in the case of a hosting server, the average load is the actual load. H(S) includes information about the number of these servers; $p_{max,S}$ and $p_{min,S}$ are the identities of hosting servers chosen among H(S). If S is a leaf, both $p_{min,S}$ and $p_{max,S}$ are the identity of S itself. When S is a leaf, i.e. a hosting server, load$_{max,S}$ and load$_{min,S}$ are the same and equal to the actual load of S. For a non-leaf server S, $p_{max,S}$, $p_{min,S}$, load$_{max,S}$ and load$_{min,S}$ are calculated in the protocol based on reports from subordinates of S.

Upon collecting reports from all subordinates, a replicator R executes the DistributeLoad protocol appearing in Listing 1 attached to this specification. Operations of the routine of Listing 1 will now be described. These operations are illustrated and summarized in the flowchart of FIG. 7. Let $S_1, \ldots, S_n$ be subordinates of replicator R, and let $S_{max}$ and $S_{min}$ be subordinates that reported the highest load and the lowest load, respectively. If load$_{max,Smax}$ exceeds load$_{min,Smin}$ by more than the distribution threshold, R determines that load re-distribution is needed. It therefore sends a message Offload($p_{min,Smin}$) to node $p_{max,Smax}$. Upon receiving this message, node $p_{max,Smax}$ executes a protocol Offload with node $p_{min,Smin}$ (described below) to shift some load from $p_{max,Smax}$ to $P_{min,Smin}$.

Then, unless R is a root replicator, it calculates and sends its own load report to its parent. R computes the average load of descendant hosting servers and the total number of such servers in the normal way. The rest of the components are calculated depending on whether or not an Offload message was sent. If it was not sent then R passes up load$_{max,Smax}$, load$_{min,Smin}$, $p_{max,Smax}$, $p_{min,Smin}$ as the corresponding part of its report.

Figure 7:
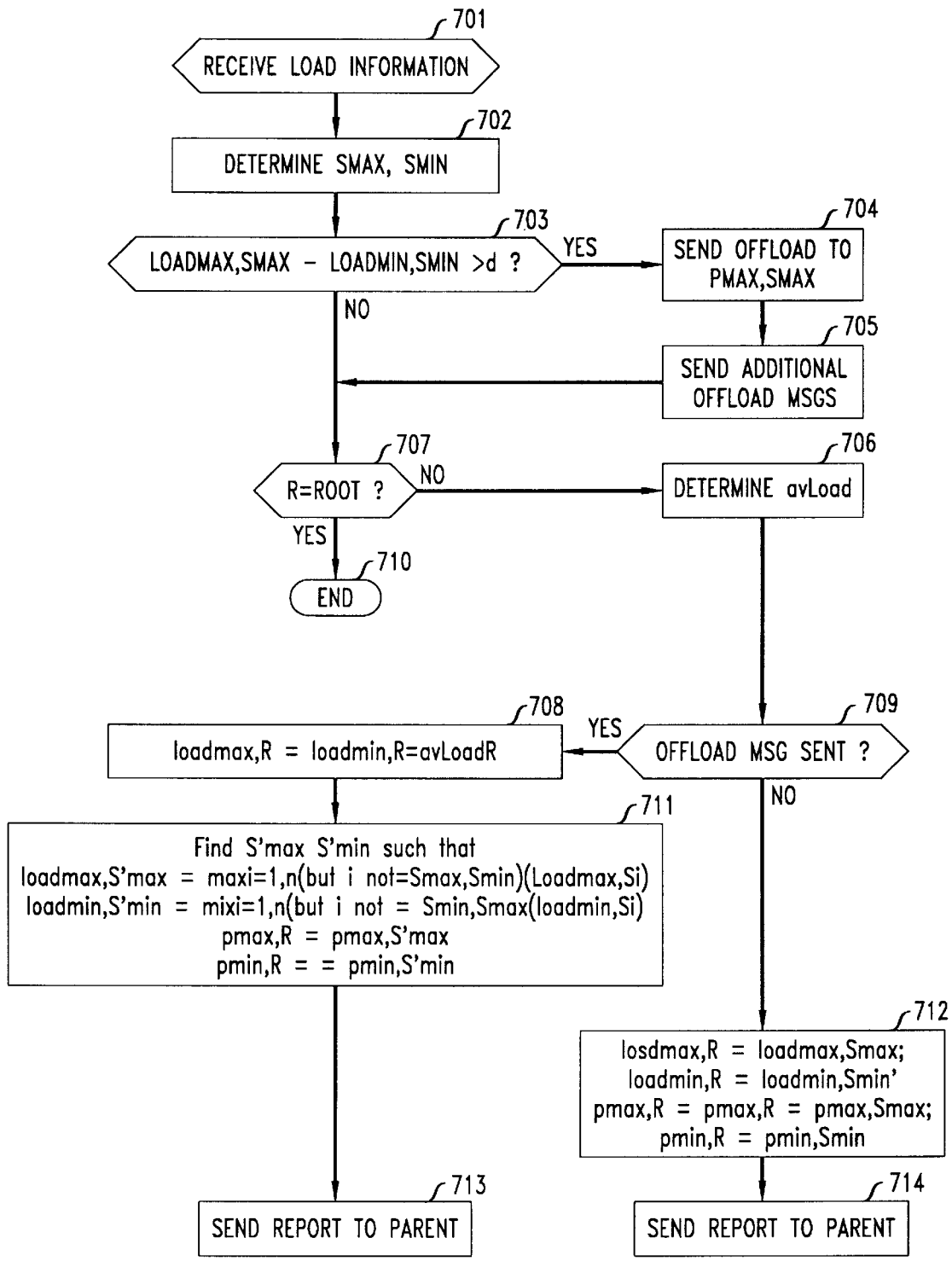
FIG. 7 is a flowchart for a preferred illustrative load balancing arrangement.

If Offload message was sent, load re-distribution will be performed between descendants of $S_{max}$ and $S_{min}$, which will render invalid their reports sent to R. Therefore, R uses avLoad$_R$ as both load$_{max,R}$ and load$_{min,R}$ in this case. The motivation for this alternative is that since R is performing load re-distribution in its subtree, it should not expose its parent to load of any subtrees beneath R. Instead, R reports the overall average load of all of its hosting servers. If an ancestor of R will find that this average load differs significantly from the load of another subtree, load re-distribution between some hosting servers of the two subtrees will be performed. As in a previous example, redistribution of load can be accomplished by messages sent at differing levels in the hierarchy of replicators. The block 705 in FIG. 7 illustrates the sending of additional offload messages. Different criteria can be set for this additional redistribution as may be required in particular cases.

Thus, R must inform its parent of hosting servers to use, should the parent decide to re-distribute the load. For this purpose, R selects $p_{min,R}$ and $p_{max,R}$.

R chooses, among subordinates excluding $S_{max}$ and $S_{min}$, $S'_{max}$, and $S'_{min}$ that reported the highest $load_{max}$ and the lowest $load_{min}$, respectively. Note that since at least three subordinates of R exist, there will always be nodes to choose from. R then sets $p_{max,R}=p_{max,S'max}$ and $p_{min,S'min}$. The reason for selecting different hosting servers is that $p_{max,Smax}$ and $p_{min,Smin}$ are already engaged in load re-distribution. This way, no hosting server will be sent multiple Offload messages in response to the same load report.

When hosting server p receives the Offload(q) message, it negotiates with q to find object x with the lowest $load(x_p)$ and such that q does not have a replica of x. If no such object x exists, p does nothing. Otherwise, if $load(x_p)$ does not exceed d, x is migrated from p to q; if loads(x) is greater, a replica of x is created on q. Further details of object migration and replication are presented below.

The motivation for the preceding procedure is that p attempts to reduce its load by migrating rather than replicating objects, provided it does not create a vicious cycle where an object is migrated back and forth the between p and q. If migration of heavily loaded objects is permitted, q might have become more heavily loaded than p as a result of migration causing x to migrate back, and so on.

The constraints on the system parameters are chosen so that, after replication, neither replica of x can be dropped. Otherwise, an infinite cycle could be created. If p has the sole replica of x in the system and $load(x_p)<d$, then if x is replicated on q, both will split this load. As a result, $load(x_q)$ could fall below $u_q$, and $x_q$ would be deleted. This would casuse $load(x_p)$ to return to its original value, causing creation of another replica of object x on q, and so on.

The importance of not basing redistribution decisions only on the average load of servers in the hosting sets of their subordinates is illustrated by the following example. Reference is made to the hierarchical structure of replicators R0, R1, R2, R3 and R4 and servers p1 through p9 in FIG. 3. The values appearing adjacent to each of the R's and p's in FIG. 3 represent the reported average loads for the respective elements. A value for the distribution threshold will be taken as equal to 4. Then, the difference between the average load reported by any two sibling replicators does not exceed the distribution threshold. However, the maximum difference in load between hosting servers exceeds the threshold. In fact, this difference can grow linearly with the height of the tree, thus violating the stability criterion.

If the same conditions appearing in FIG. 3 are used to direct the load-balancing embodiment reflected in Listing 1, then a successful redistribution of load will be accomplished. In particular, R3 will report $load_{min,R3}=load_{min,Smin}=5$. R4 will report $load_{max,R4}=6$, and $load_{max,R4}=8$. Thus R2 will find $load_{max,Smax}-load_{min,Smin}=6>4$, and send Offload(p4) to p9. In addition, R2 will report the average load of all of its host descendants, $load_{max,R2}=load_{min,R2}=5.33$ (since it sent the Offload message). At the same time R1 will report $load_{min,R1}=1$ and $load_{max,R1}=4$, because it did not sent the Offload message. Therefore, R0 will discover $load_{max,Smax}-load_{min,Smin}=4.33>4$ and send Offload(p1) to p8.

Name Service

The name service 120 in FIG. 1 is a gateway to the information systems shown there. It advantageously comprises computer processing and database functionality to supports the following requests:

1. RegisterObject(physicalName). This request typically comes from a system administrator upon creating a new object. In response, the name service returns a symbolic name assigned to this object. Parts of this name can be proposed by the administrator or the author of the object, but the system must ensure that the overall name is unique and that it resolves into the name service identity and access method.
2. GetObject(symbolicName). This request comes from a client. The resulting response after processing by the name service 120 is advantageously a "redirect" message Redirect(physicalName) with the physical name of a replica of the object.
3. CreateReplica(symbolicName, physicalName). This request comes from a hosting server when an additional replica of the object is created. The name service must add the physicalName to the set of physical names that is mapped to symbolicName. The name service must also acknowledge to the sender of the request that the above operation has succeeded.
4. DeleteReplica(symbolicName, physicalName). This request comes from a hosting server when a replica with physicalName is deleted. The name service removes physicalName from the set of physical names corresponding to symbolicName. An exception to this deletion when this is the last physical name in the set, in which case the name service returns a negative acknowledgement to the sender. The name service also sends a positive acknowledgement to the sender of the request if the delete operation has succeeded. With this acknowledgement, the name service includes a resolved-cnt counter, which contains the number of times the name service sent a Redirect message with this physical name.

The typical large scale of the system of the presently described illustrative embodiment, together with the short lifetime of data cached at the clients, usually suggests that there must be a very large number of replicas of the name server (potentially on the order of thousands for a global network). However, the high frequency of updates to the mapping database requires that the number of replicas be kept low, since updating a large number of replicas is impractical.

To avoid this dilemma, the functionality of the name server is split between two components. One component keeps only non-volatile data and can be highly replicated. The other keeps volatile data, with scalability achieved through partitioning of the database. Then, the number of replicas of this component is dictated only by availability requirements, and can be low (e.g., between one and three replicas of each segment of the database).

Figure 4:
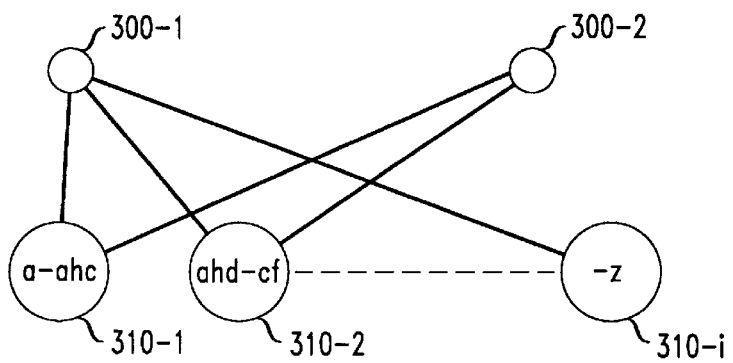
FIG. 4 shows a naming service arrangement for use in the system of FIG. 1.

The structural organization of the name server is shown in FIG. 4, where a plurality of distributors 300-*i* is shown interconnected with a plurality of redirectors 310-*j*. The symbolic name space is partitioned among these redirectors based on a selected hash function. While other particular partitionings will occur to those skilled in the art one simple way is to base partitioning on the lexicographical ordering of names, as shown in the in FIG. 4. This hash function is known to distributors 300-$i$. Note that while the mapping database is updated frequently, the hash function that partitions the namespace among redirectors is very stable.

Requests from clients for name resolution arrive at distributors 300-$i$ which distribute these requests to the appropriate redirectors by applying the hash function to the symbolic name in the request. Redirectors 310-$j$ in FIG. 4 generate "redirect" directives with corresponding physical names and send them back to distributors, to be forwarded to the clients. Redirectors can respond directly to clients, but it is usually preferable to preserve a pure client/server (or request/response) approach. If a client is capable of caching the hash function, the client itself can determine which redirector to send its request to, and can then send the request directly to it.

A client seeking a desired object in a load-sharing replications systems of the type generally illustrated in FIG. 1 and described in illustrative embodiments herein, must be able to find a distributor to which to send an appropriate request. This can be done using a new mechanism that mimics the DNS approach for locating its root servers (which function in a similar manner to the distributors of FIG. 4.) Such a mechanism requires storing a variable pointing to a distributor at each client.

However, it will prove advantageous in some cases to deploy a plurality of systems of the type generally illustrated in FIG. 1. With a plurality of such systems deployed (e.g., in an Internet context), each system will have a respective set of distributors of the type shown in FIG. 4. Since a client should be able to access objects hosted by all such systems, the mimiced-DNS approach provides that, when a new system is deployed, all existing client sites add a pointer to one of the distributors of the new system. However, given the typically large number and diversity of clients, this often makes deploying a new system very difficult. Equally difficult in systems of large size is changing the set of distributors a given system.

A preferred alternative to recreating certain aspects of the existing DNS system in realizing the functionality of a system like that described above and shown in FIGS. 1 and 4, is to rely on existing DNS infrastructure to locate distributors. Since an object name determines a DNS name of the server to which the request for the object should be sent, the client will go to that DNS server to resolve it into an IP address. It proves advantageous for this DNS server to map the object name into a set of IP addresses of distributors. In response to a client's query, the DNS server will send the IP address of a distributor to the client. In a preferred embodiment the IP address sent to the client is that of a server that is geographically closest (or otherwise has the lowest connection cost) to the client. H. W. Braun and K. C. Clafy, "An experimental means of providing geographically oriented responses relative to the source of domain name server queries," Technical Report, San Diego Supercomputing Center, April, 1994 describes an implementation of DNS name resolution based on the origin of the requester. This paper is hereby incorporated by reference as if set out herein in its entirety.

Note that the described use of DNS services in the context of the present inventive embodiments conforms to the assumption underlying the existing DNS, viz., the mapping of DNS names into IP addresses changes slowly. Unlike sets of replicas for a given object, the set of distributors changes infrequently. Thus, existing caching mechanisms will keep the load on DNS service manageable.

Creation and Deletion of Replicas

Creation and deletion of replicas must be coordinated with modifications of the name mappings on the name server 120 in FIG. 1. Otherwise, there may be periods of inconsistency between the mapping database on the name server and the actual replica sets. Such inconsistencies may lead to a situation in which the name server resolves a symbolic name to the physical name of a replica that no longer exists. The client would then have to repeat its request from scratch, possibly many times, until the name server resolves the symbolic name into a valid replica.

It is possible to avoid such inconsistency by running replica deletion and mapping update as one distributed transaction, and name resolution as another. This, however, can, in some cases, lead to interference of load distribution activity with user requests.

The protocols for deleting and creating replicas in accordance with the present embodiment avoid distributed transactions by maintaining an invariant: the set of physical names to which a symbolic name is mapped always forms a subset of currently valid replicas. To this end, when a new replica is created, the mapping on the name server is modified only after the replica has been created. When a replica is to be deleted, the hosting server first requests the name server to exclude this replica from the mapping. Only after obtaining the conformation from the name server that it successfully did so, does the hosting server delete the replica. Object migration is accomplished by replica creation on the recipient node followed by replica deletion on the source node.

Figure 8:
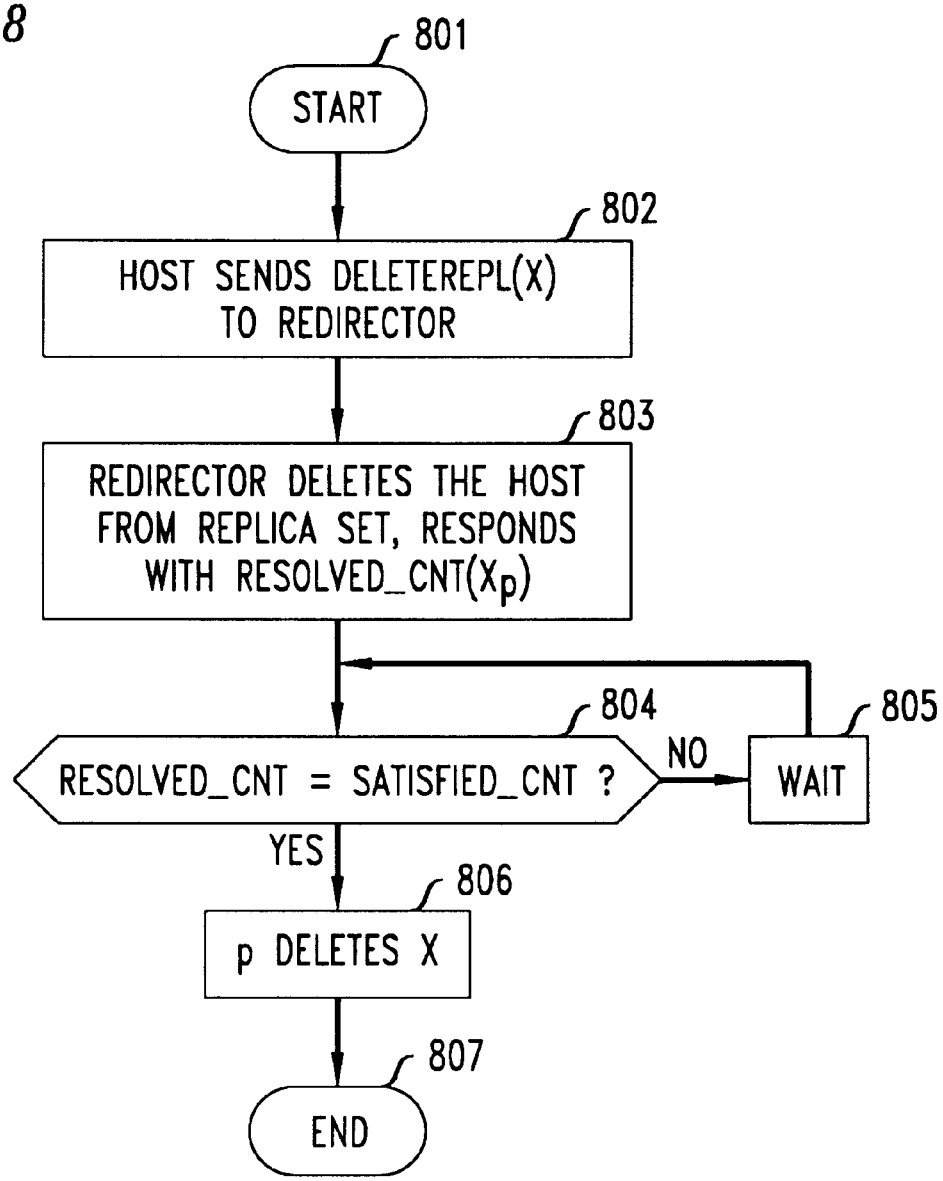
FIG. 8 is a flowchart showing an illustrative method for deleting a replica.

This ensures that symbolic names are always resolved to valid replicas. There is still a possibility that between the time the client receives the physical name from the name server and the time the client accesses the corresponding replica, the replica may be deleted. This problem is avoided by maintaining two counters, resolved-cnt and satisfied-cnt. resolved-cnt is maintained by the name server for every physical name, and is incremented every time this name is returned to a client. satisfied-cnt is maintained by hosting servers for every replica and is incremented every time the corresponding replica is used to satisfy a client request When a hosting server decides to delete a replica, it first sends a request to the name server to delete the corresponding physical name from the mapping (as described above). With its acknowledgement, the name server returns the value of resolved-cnt for this name. Note that after that, no new client requests will be directed to this replica because its physical name is excluded from the name mapping. If resolved-cnt received by the hosting server is equal to satisfied-cnt of the replica, then all client requests that the name server directed to this replica have been satisfied and the replica can be safely deleted. Otherwise, replica deletion is delayed until both counters become equal, up to a predetermined timeout, after which the system assumes that the client died or killed the request in progress. and removes the replica. Should the request arrive after the timeout, it will fail—and the client will repeat the entire request (starting with the symbolic name resolution) from scratch. An advantage of this approach over the naive uncoordinated replica deletion is that this event is highly unlikely. This process is illustrated and summarized in the flowchart of FIG. 8.

Another Example System

A further example using the above-described name service organization and infrastructure will now be described for the case of a World-Wide-Web (Web) information system.

The system contains Web servers and Web browsers (clients). Web servers host objects and provide access to them by making object names (uniform resource locators, or URLs) known to the users. A URL for an object directly embeds the identity of its hosting server and access method (the protocol to be used by the browser to access the object). For example, a URL http://www-db.marketing.abcd.com/ foo.html embeds the domain name of the host that serves the object (www-db.marketing.abcd.com), the protocol to be used to access the object (http), as well as the object of interest (foo.html). Web objects may form a hyper-text system, with one object containing links to other objects. These links are implemented by including URLs of other objects in the object body. Objects can be passive (e.g. text or image pages) or active. When an active object (typically referred to as a CGI script) is accessed, an executable module runs on the server and dynamically generates data to be returned to the client. Clients obtain objects by connecting to the host (www.marketing.abcd.com.) and requesting the object (foo.html). Many Web browser implementations are in use today (e.g., Mosaic and Netscape browsers. etc).

In the current example, when an object foo.html is created, it is placed on one of the hosting servers, for instance, server.abcd.com. Thus, its physical URL becomes http://server.abcd.com/foo.html. Then the object is registered with the system name service, which assigns a symbolic URL (e.g., http://name-server.abcd.com/symb-foo) to the object.

It is the symbolic URL of the object that is advertised to the users. Since the client uses the symbolic URL, its requests for the object arrive at name server nameserver.abcd.com rather than the hosting server. (Recall that multiple name servers may use the same DNS name nameserver.abed.com.) This request triggers the execution of the system script that maps symb-foo to a physical URL http://server.abcd.com/foo.html. The physical URL is then sent to the client via the redirect message, which is part of the standard HTTP protocol that existing Web browsers understand. The client then uses that physical URL to obtain the object in the usual manner.

As the hosting server becomes overloaded, the replicator service described above will cause the creation of a replica of the object (replica-foo-1) on another available hosting server, say, server2.abcd.com. This replica's physical URL is http://server2.abcd.com/replica-foo-1. Subsequent requests for the object are redirected to one of the two replicas in a round-robin or other prescribed manner.

With suitable accommodations for existing Web procedures (which may not be present in other large information networks), existing Web browsers may be used to locate and access objects for the current example system, thus making the system transparent to the user. These accommodations will be described below. The need for accommodations arises from the following conditions.

First, an object may use a partial URL to organize a link to another object that resides on the same server. Partial URLs do not contain hosting server information— existing browsers by convention use the hosting server of the parent object to send the request for an object referenced by a partial URL. Suppose an object,foo.html, has a link to another object, bar.html. Moreover, it will be assumed that bar.html is not registered with the system, so that its physical URL is used. If bar.html resides on the same server, foo.html used a partial URL to refer to it. When the load balancing system of FIG. 1 moves foo.html to server2. abcd.com, the link to bar.html will become invalid; this server does not have such object.

To deal with this problem, it proves advantageous to expand the object registration procedure. When the object is registered with the system, the name server requests the hosting server that keeps the object to convert all partial URLs into full URLs. This conversion is accomplished following the same rules as those applied by the browser when it encounters a partial URL.

With active objects, a few additional accommodations are sometimes useful. In particular, since the text that is returned to the client is generated dynamically by an executable, partial URLs cannot be resolved and headers cannot be inserted at registration time. However, the "composite URL" and Java-based solutions to the hot list problem work for active objects as well as passive objects. Partial URL problems, can be dealt with by imposing a restriction on the style in which SGI scripts are written. In particular, it proves convienient to require that such scripts use only full URLs in the generated text.

Other modifications and variations of the disclosed methods and systems will be apparent upon reading of the present disclosure; some of these will now be briefly discussed.

Geographical Considerations

For example, the geographic location of clients may be included in the course of determining object replication and migration. For this variant, it proves convenient to group the universe of hosting servers into regions. This may be done on a country, world-wide (global) or other basis. Orbiting satellite servers may also be included, either in terrestrial regions or in one or more satellite-only regions. In any event, each hosting server is assigned to a region. It also proves convenient to seek to have all messages exchanged pursuant to the modified protocol remain of constant length.

The region for a replicator is taken as the union of regions of its subordinates. Each hosting server compiles statistics on the geographical origins of requests for objects. With its load report, the hosting server includes the statistics on the n objects that are most frequently requested from outside its region, where n is a system parameter determined by experience with particular networks. The statistics for an included object include, e.g., those for up to m regions that contributed the most to the outside requests.

According to the geographical extension to the basic protocols described above, a replicator R migrates or replicates reported objects among its subordinates to minimize the number of outside requests for the subordinates. The replicator then reports up to its parent the n objects reported to R which have the greatest number of requests from outside R's region. For the present geographical variant, it proves convenient to include in a determination of replica placement only immediate subordinate of a replicator, and not leaf servers. Thus replication placement decisions are reported by a replicator down through its subordinates instead of notifying leaf servers. Experience will dictate in particular cases how to resolve any possible conflict between improving load balancing and improving distance or cost factors associated with geography-based placement decisions.

Replication Strategies

The preceding discussion of methods and system for load balancing and improving geography or distance and message handling costs in information systems has, for simplicity of exposition, adopted an approach that starts with a small number of object replications and creates additional replicas as the demand for objects grows. Alternative embodiments, all within the scope of the present invention will seek to have as many replicas of objects as possible, and to drop or delete replicas when the demand for space grows due to hosting for new objects. Other factors occasioning increased demand for space include the presence of objects that prove to be in very high demand. In any event, those skilled in the art will recognize that the presently disclosed methods and systems permit for the orderly reduction of replicas as required. Another variant for migrating high-demand objects is to associate such objects (including, as appropriate, lower-demand objects associated with one or more "hot" objects) for migration as a group.

Those skilled in the art will also recognize the advantages of caching objects or name resolution results to enhance network speed and reduce message traffic. The systems and methods described above, permit caching at many levels, including client caching, proxy cashing (at one or more hierarchical levels) and at the overall system level.

---

Listing 1

---

DistributeLoad():
/*Executed by replicator R*/
  Let $S_1, \ldots, S_n$ be the set of subordinates of R.
  Find $S_{max}$ such that $load_{max, Smax} = max_{i=1,n}(load_{max,Si})$ and
    $S_{min}$ such that $load_{min,Smin} = min_{i=1,n}(load_{min,Si})$
  If $load_{max, Smax} - load_{min,Smin} > d$, then
    send Offload($p_{min,Smin}$) to $p_{max,Smax}$;
  endif
  If R ≠ root then $$avLoad_R = \frac{\sum_{k=1}^{n} avLoad_{S_k} * |H(S_k)|}{\sum_{k=1}^{n} |H(S_k)|};$$

$$|H(S_R)| = \sum_{k=1}^{n} |H(S_k)|;$$

If Offload message was not sent then
      $load_{max,R} = load_{max,Smax}$;
      $load_{min,R} = load_{min,Smin}$;
      $p_{max,R} = p_{max,Smax}$ and $p_{min,R} = p_{min,Smin}$;
    else
      $load_{max,R} = load_{min,R} = avLoad_R$;
      find $S'_{max}$ and $S'_{min}$ such that
        $load_{max,S'max} = max_{i=1,n;i \neq Smax,Smin}(load_{max,Si})$ and
        $load_{min,S'min} = min_{i=1,n;i \neq Smin,Smax}(load_{min,Si})$;
      $p_{max,R} = p_{max,S'max}$ and $p_{min,R} = p_{min,S'min}$;
    endif
    send report to parent;
endif

---

What is claimed is:

1. A replication service system for balancing processing load among a plurality of geographically separated information servers serving requests for objects from a plurality of clients, said replication service system comprising
   a plurality of replicators, each said replicator receiving messages relating to the loading on a respective selected plurality of less than all of said information servers, said replicators each forming differences based on said received messages, said differences relating to the difference in loading between respective ones of said respective selected plurality of servers, and
   a messaging system for sending messages between replicators in response to said differences, said messages indicating maximum and minimum loading on ones of said selected plurality of said information servers, said messaging system comprising means for sending messages directing the occurrence of a distribution event between selected ones of said information servers, said distribution events comprising at least one of
     (i) migrating an object from at least a selected one of said information servers to at least another selected one of said information servers, or
     (ii) copying an object from at least a selected one of said information servers to at least another selected one of said information servers.

2. The system of claim 1, wherein said messaging system comprises means for directing said occurrence of a distribution event when said differences indicate an unbalance loading that exceeds a predetermined threshold.

3. The replication service system of claim 1, wherein said plurality of replicators are arranged in hierarchical tree relation, said tree having a root replicator and a plurality of replicators descending from said root replicator, said plurality of information servers being connected as leaves to terminating branches of said tree.

4. The replication service system according to claim 3, wherein said messaging system further comprises means for sending messages directing the occurrence of a distribution event between selected ones of said information servers.

5. The replication service system according to claim 2, wherein said distribution event is a migration of an object from a more highly loaded server to a less highly loaded server.

6. The replication service system according to claim 2, wherein said distribution event is a replication of an object from a more highly loaded server to a less highly loaded server.

7. The replication service system according to claim 4, wherein at least one of said replicators comprises means for determining the subordinate server having the maximum load, the subordinate server having the minimum load and means for determining whether said maximum load and said minimum load differ by more than a predetermined threshold amount.

8. The replication service system according to claim 7, wherein said messaging system comprises means for sending said message directing a distribution event only when said determining occurs at said root replicator.

9. The replication service system according to claim 7, wherein said messaging system comprises means for sending said message directing a distribution event when said determining occurs at any of said replicators.

10. A method for balancing processing load among a plurality of geographically separated information servers serving requests for objects from a plurality of clients, said method comprising
   at each of a plurality of replicators,
     receiving messages relating to the loading on a respective selected plurality of less than all of said information servers,
     forming differences based on said received messages, said differences relating to the difference in loading between respective ones of said respective selected plurality of servers, and
     sending messages to at least one other of said replicators in response to said differences, said messages indicating maximum and minimum loading on ones of said selected plurality of said information servers, and
   sending messages from selected ones of said replicators directing the occurrence of a distribution event between selected other ones of said information servers, said distribution event comprising at least one of
     (i) migrating an object from at least a selected one of said information servers to at least another selected one of said information servers, or
     (ii) copying an object from at least a selected one of said information servers to at least another selected one of said information servers.

11. A naming service system for mapping at least one physical name to each symbolic name used by a client in a request to obtain access to an object in one or more information servers in a system of information servers, said naming service system comprising

- a plurality of redirectors for redirecting a client request to one of a set of information servers storing said requested object,
- a plurality of distributors for storing information for mapping said symbolic name into the name of a redirector associated with a partition of the symbolic name space, said partitioning of said symbolic names being lexicographical, and
- means for effecting a distribution event between respective ones of a plurality of said information servers in response to differences in loading between said respective ones of said plurality of servers, and
- means for updating information available to said redirectors respecting said set of information servers storing said requested object to reflect the occurrence of a distribution event affecting said requested object, said distribution event comprising at least one of
    (i) migrating an object from at least a selected one of said information servers to at least another selected one of said information servers, or
    (ii) copying an object from at least a selected one of said information servers to at least another selected one of said information servers.

12. The naming service system of claim 11 wherein said distributors comprise hashing means for determining the redirector to which said request is mapped.

13. The naming service system of claim 11 wherein said distributors comprise Domain Name Service (DNS) servers.

* * * * *